July 11, 1961  J. EDWARDS  2,991,542
STRAIN GAUGES

Filed Aug. 4, 1958

INVENTOR
JOHN EDWARDS

BY
ATTORNEYS

July 11, 1961  J. EDWARDS  2,991,542
STRAIN GAUGES

Filed Aug. 4, 1958  2 Sheets-Sheet 2

INVENTOR
JOHN EDWARDS

BY
ATTORNEYS

United States Patent Office 2,991,542
Patented July 11, 1961

2,991,542
STRAIN GAUGES
John Edwards, Heaton Chapel, England, assignor to A. V. Roe & Co. Limited
Filed Aug. 4, 1958, Ser. No. 753,047
Claims priority, application Great Britain Aug. 13, 1957
4 Claims. (Cl. 29—155.62)

This invention relates to strain gauges and to methods of making same, and has for its object to provide strain gauges of uniform characteristics and improved accuracy.

According to the present invention a strain gauge comprises a plurality of substantially parallel resistance wires which are connected in series by means of transverse wires of relatively low resistance. Such transverse wires may be in ribbon form and be spot welded to the resistance wires, after which the resistance wires are tensioned and bonded to a backing.

Stain gauges and the method of making same, in accordance with the invention, give the advantages that the wires are uniformly tensioned and a regular grid form is provided, both of which lead to better uniformity between one gauge and another, and to consistent behaviour when in use. There is the further advantage that the resistance wires and the much larger cross-section connecting ribbon wires may be made of the same material, thus eliminating parasitic thermo-electric potential differences.

In known strain gauges there is a small undesired response to transverse dimensional changes as well as the desired response to changes in longitudinal dimensions. Such a transverse response gives an error in indication of the gauge. In strain gauges in accordance with the invention this error is greatly reduced, thereby resulting in improved accuracy of the gauge.

If desired the plurality of wires may be replaced by a single wire.

A method of manufacturing strain gauges in accordance with the invention will now be described by way of example, with reference to the accompanying drawings, in which FIGURE 1 is a perspective view of a spool frame for feeding wire onto gauge frames.

Figure 1:
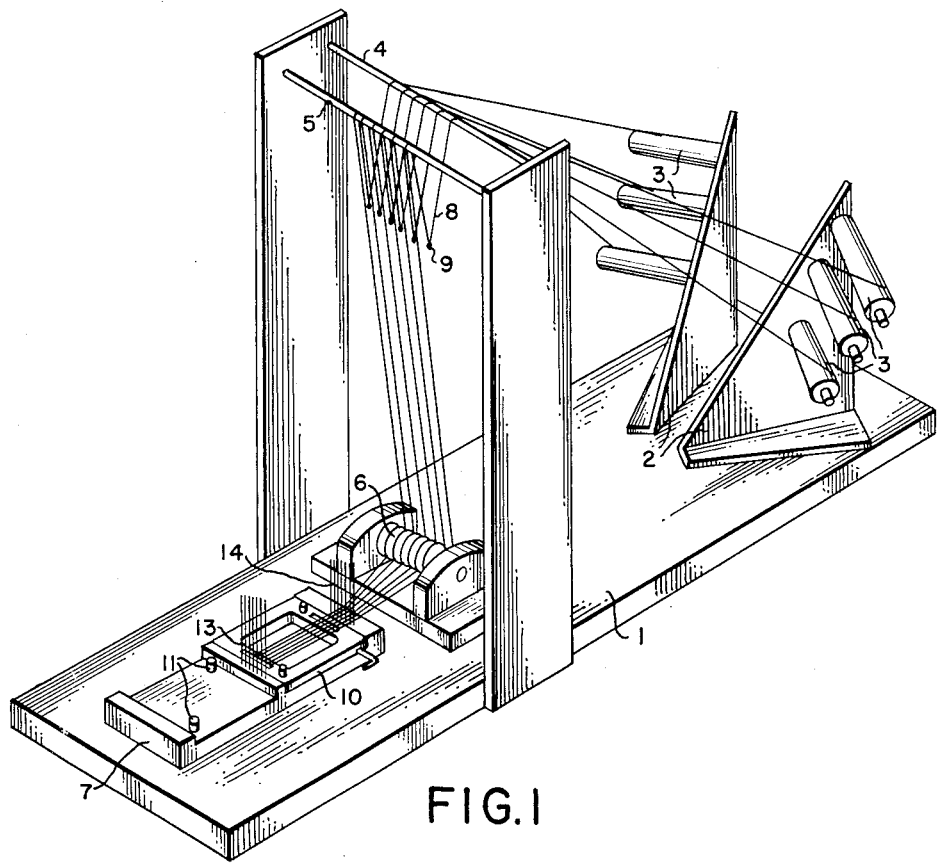
Figure 2:
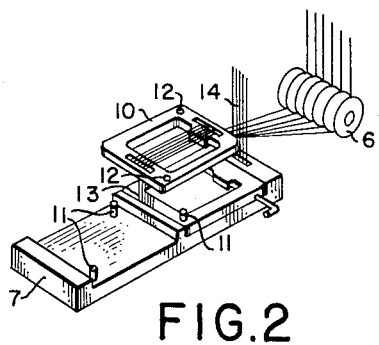
FIGURES 2 and 3 show the gauge frame transfer operation carried out on the spool frame.

Referring to FIGURE 1 the spool frame comprises a base 1 which supports spool carriers 2 with spools 3 of resistance wire, each of which wires feeds over rods 4 and 5, and round a grooved pulley 6 to a gauge frame locating platform 7. Between the rods 4 and 5, each wire hangs in a loop 8 supporting a weight 9 for tensioning purposes. The locating platform 7 has two in-line positions for gauge frames 10, locating pegs 11 being provided for engaging corresponding holes 12 (FIGURE 2) in frames 10. On platform 7 there is also provided a short set of stiff upright guide wires or rods 13 and a longer set 14.

Figure 4:
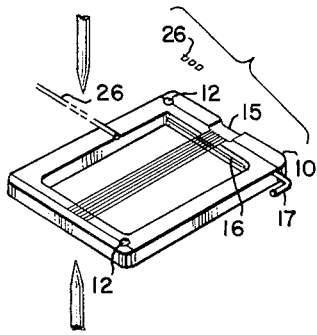
FIGURE 4 shows schematically the welding of ribbon transverse connections to the wires.

The gauge frames 10 are rectangular in shape and each has a section 15 (best seen in FIGURE 4) which is urged outwards by a spring 16 but which may be locked in its inner position by a pin 17 passing through holes in the frame and the section 15.

Figure 3:
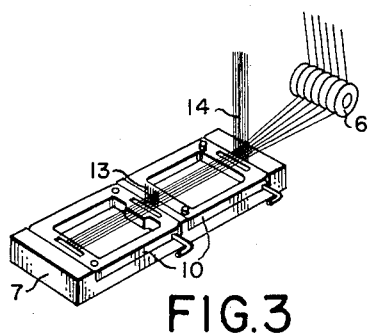

The resistance wires are arranged to pass between the guides 13 and 14 and the run of wires over a frame 10 in the first position is secured thereto by adhesive tape, the wires at one end being secured to the section 15. The frame is then lifted and a second frame is placed in the first position (see FIGURE 2) and the first frame is placed in the second position (see FIGURE 3). By this means the wires are drawn over the second frame and at the same time accurately positioned. After the wires have been secured to the second frame by adhesive tape, the wires connecting the two frames are severed, the first frame removed and the operation then repeated. The first frame of any run of gauges prepared on the spool frame is likely to be of poor grid form but subsequent ones are of good form since the wires are fed carefully on to the next following frame by the transference of a frame from the first to the second position.

Figure 5:
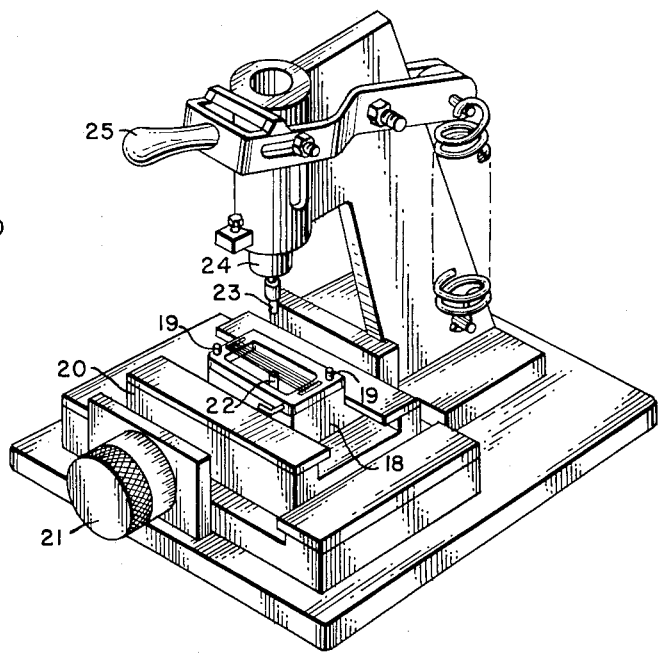
FIGURE 5 is a perspective view of the welding jig used.

The next stage in the making of a gauge is the spot welding of the low resistance transverse wires in the form of metal ribbon 26, to connect the resistance wires in series and give a continuous grid complete with connecting tags. This operation is shown diagrammatically in FIGURE 4 and is carried out on the welding jig shown in FIGURE 5. The jig comprises a sliding platform 18 having locating pegs 19 for engaging the gauge frame holes 12 and carried in a second sliding platform 20, the movement of which is effected by a micrometer control 21. One welding electrode 22 is provided immediately underneath the position of the gauge wires and the other electrode 23 is carried in a welding head 24 which is moved into the welding position via a handle 25.

Figure 6:
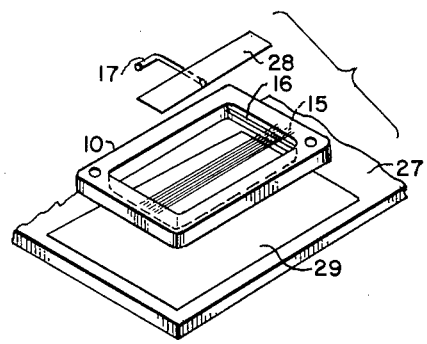
FIGURES 6 and 7 show diagrammatically the various stages in the backing and bonding of the gauge.
Figure 7:
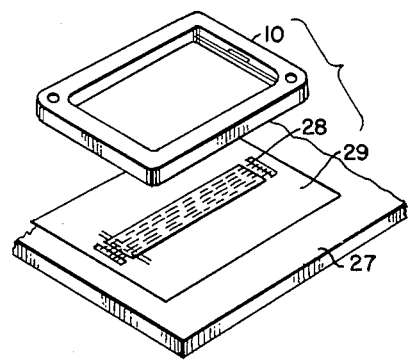

After the ribbons have been spot welded to the resistance wires, the gauge frame 10 is inverted onto a paper backing 29 resting on a block of polytetrafluorethylene 27 and a top backing paper 28 is applied as shown in FIGURE 6. By removing pin 17, the force of spring 16 is applied to the small section 15 which tensions the grid wires. The wires, ribbon and backing are then bonded by an adhesive before being removed from the frame 10 (see FIGURE 7) and trimmed to size.

Paper backing bonded with suitable adhesive will withstand medium temperatures but if a high temperature strain gauge is required a woven glass cloth can be used for the backing and a ceramic cement for the adhesive. The maximum operating temperature depends on the backing. For a ceramic-backed gauge this temperature is 750° C. The fact that the joints are welded instead of soldered helps to raise the maximum operating temperature.

During construction the gauge grid may be transferred on to a rigid frame (plastic or metal) without the paper or glass cloth backing, and stored or transported. Thus, for work where low weight is desirable (measuring rotor strains) or where the backing is likely to disintegrate (atomic particle bombardment), the gauge may be bonded directly onto the surface concerned from the frame without any backing.

What is claimed is:

1. A method of making a strain gauge comprising withdrawing a plurality of separate resistance wires from separate spools mounted on a fixed support, positioning the separate wires in parallel, connecting said resistance wires in series by spot welding transverse wires of lower resistance to the resistance wires, tensioning the resistance wires and bonding them to a backing while under tension.

2. A method of making a strain gauge which comprises, positioning a plurality of separate resistance wires in parallel across the ends of a frame in which one end is movable, securing the ends of the wires to the frame ends, spot welding wires of lower resistance to the resistance wires to connect them in series, moving the movable end of the frame to tension the resistance wires, bonding the wires to a backing while they are held under tension and removing the frame from the bonded wires.

3. A method of making strain gauges which comprises, withdrawing a plurality of separate resistance wires from supply spools, positioning the wires in parallel across the ends of a frame in which one end is movable, securing the ends of the wires to the frame ends, moving the frame with the wires longitudinally of the wires to draw further lengths of resistance wires from the spools and positioning them across the ends of a second like frame and securing them to the ends of the second frame, severing the wires at the portions between the frames, spot welding transverse wires of lower resistance to the resistance wires on the first frame to connect them in series, moving the movable end of the first frame to tension the resistance wires, bonding the wires on the first frame to a backing while they are held under tension and removing the frame from the bonded wires.

4. A method of making a strain gauge comprising withdrawing a plurality of separate resistance wires from separate spools mounted on a fixed support, positioning the separate wires in parallel, connecting said resistance wires in series by spot welding transverse wires of lower resistance to the resistance wires, tensioning the resistance wires and bonding them to a rigid frame while under tension.

References Cited in the file of this patent

UNITED STATES PATENTS

| | | |
|---|---|---|
| 2,457,616 | Van Dyke et al. | Dec. 28, 1948 |
| 2,548,592 | De Michele | Apr. 10, 1951 |
| 2,837,619 | Stein | June 3, 1958 |

FOREIGN PATENTS

| | | |
|---|---|---|
| 526,596 | Great Britain | Sept. 20, 1940 |
| 674,740 | Great Britain | July 2, 1952 |
| 859,825 | Germany | Dec. 15, 1952 |

OTHER REFERENCES

Proceedings of The Society for Experimental Stress Analysis, vol. I, No. 2, 1943, pp. 43–55 (especially p. 51).

Proceedings of The Society for Experimental Stress Analysis, vol. II, No. 1, 1944, pages 113–127.